(12) United States Patent
Dunham et al.

(10) Patent No.: US 10,557,555 B2
(45) Date of Patent: Feb. 11, 2020

(54) ADDITIVELY MANUFACTURED VALVE ASSEMBLY

(71) Applicant: General Electric Company, Schenectady, NY (US)

(72) Inventors: Earl Neal Dunham, Hamilton, OH (US); Aigbedion Akwara, Cincinnati, OH (US); Jared Matthew Wolfe, West Chester, OH (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 15/706,879

(22) Filed: Sep. 18, 2017

(65) Prior Publication Data

US 2019/0085983 A1    Mar. 21, 2019

(51) Int. Cl.
| | |
|---|---|
| *F16K 1/20* | (2006.01) |
| *F16K 1/16* | (2006.01) |
| *F16K 15/03* | (2006.01) |
| *B33Y 80/00* | (2015.01) |
| *B22F 3/105* | (2006.01) |
| *B33Y 10/00* | (2015.01) |
| *B22F 5/00* | (2006.01) |

(52) U.S. Cl.
CPC .......... *F16K 1/2028* (2013.01); *B22F 3/1055* (2013.01); *B33Y 10/00* (2014.12); *B33Y 80/00* (2014.12); *F16K 1/165* (2013.01); *F16K 15/03* (2013.01); *F16K 15/038* (2013.01); *B22F 5/008* (2013.01); *B22F 2999/00* (2013.01)

(58) Field of Classification Search
CPC ........ F16K 1/2028; F16K 1/165; F16K 1/223; F16K 15/038; F16K 1/16–225; F16K 15/03–038; B33Y 10/00; B33Y 80/00; B22F 3/1055
See application file for complete search history.

(56) References Cited

U.S. PATENT DOCUMENTS

| | | | |
|---|---|---|---|
| 4,863,467 A * | 9/1989 | Bokros | A61F 2/2403 623/2.3 |
| 5,711,343 A * | 1/1998 | Beckett | F16K 15/038 137/512.1 |
| 7,674,361 B2 | 3/2010 | Cohen | |
| 7,758,018 B2 * | 7/2010 | Pereira Madeira | F02D 9/103 251/305 |
| 9,500,230 B2 | 11/2016 | Hiller et al. | |
| 9,562,616 B2 | 2/2017 | Strom et al. | |

(Continued)

FOREIGN PATENT DOCUMENTS

WO    WO2016/133497 A1    8/2016

*Primary Examiner* — Marina A Tietjen
(74) *Attorney, Agent, or Firm* — Dority & Manning, P.A.

(57) ABSTRACT

A valve assembly and a method of additively manufacturing the same are provided. The valve assembly includes a valve housing defining first and second mounting features, such as recessed dimples or protruding bumps, positioned on opposite sides of a substantially cylindrical channel to define a hinge axis. One or more valve flaps are positioned within the cylindrical channel, each valve flap including a hinge member extending along the hinge axis and defining two or more complementary features or coupling members for engaging either the mounting features of the valve housing or an adjacent hinge member.

16 Claims, 8 Drawing Sheets

(56) References Cited

U.S. PATENT DOCUMENTS

| | | | |
|---|---|---|---|
| 2016/0069461 A1* | 3/2016 | Chou | F16K 7/06 |
| | | | 417/412 |
| 2016/0238251 A1 | 8/2016 | Chang | |
| 2017/0023061 A1 | 1/2017 | Sanz | |
| 2017/0028640 A1 | 2/2017 | Harrison et al. | |
| 2017/0072634 A1 | 3/2017 | Reznar | |
| 2017/0096847 A1 | 4/2017 | Liu et al. | |
| 2017/0356561 A1* | 12/2017 | Reszewicz | F16K 15/038 |
| 2018/0238209 A1* | 8/2018 | Suzuki | F01N 1/165 |
| 2018/0310772 A1* | 11/2018 | Peters | F16S 3/08 |

\* cited by examiner

ADDITIVELY MANUFACTURED VALVE ASSEMBLY

FIELD

The present subject matter relates generally to a valve assembly, or more particularly to an additively manufactured valve assembly.

BACKGROUND

Valves are commonly used in a variety of industries for regulating, directing, or controlling a flow of fluid. Valves typically include a housing that defines a passageway providing fluid communication between two or more fluid conduits. A body positioned within the passageway may be manipulated to permit, restrict, or otherwise regulate a flow of fluid through the passageway.

For example, a conventional "flapper" valve may define a passageway and include a hinge pin extending through a center of the passageway. One or more valve flaps are rotatably mounted to the hinge pin and are configured for pivoting between an open and a closed position. More specifically, the valve flaps may be configured for pivoting toward an open position when fluid flows in a forward direction and may pivot back to a closed position when fluid flows in a reverse direction. In this regard, the valve flaps may be seated on a valve seat or may engage another mechanical stop in the closed position to prevent the reverse flow of fluid.

However, conventional valves or valve assemblies include multiple components which must be separately manufactured, procured, assembled and/or maintained. For example, assembling a flapper valve as described above requires passing a hinge pin through multiple hinge knuckles on the valve flaps and fixing the hinge pin within the valve housing. Thus, such valve assemblies are more expensive due to the increased number of components needed and the assembly time required. In addition, each joint, fastening point, or other mating surface introduces a new potential leak or failure point. Therefore, certain conventional valve assemblies cost more, are less reliable, and generally exhibit poor performance.

Accordingly, an improved valve assembly would be useful. More specifically, a valve assembly that is reliable and easy to manufacture and assemble would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured valve assembly is provided. The valve assembly includes a valve housing defining a substantially cylindrical channel, a first mounting feature, and a second mounting feature, the first mounting feature and the second mounting feature being positioned at opposite sides of the cylindrical channel to define a hinge axis. A first valve flap includes a first hinge member, the first hinge member extending along the hinge axis and defining a first complementary feature for engaging the first mounting feature of the valve housing and a first coupling member. A second valve flap includes a second hinge member, the second hinge member extending along the hinge axis and defining a second complementary feature for engaging the second mounting feature of the valve housing and a second coupling member for engaging the first coupling member. The valve housing, the first valve flap, and the second valve flap are simultaneously additively manufactured as distinct, but inseparable monolithic components.

In another exemplary embodiment of the present disclosure, a method for manufacturing a valve assembly is provided. The method includes depositing a layer of additive material on a bed of an additive manufacturing machine and selectively directing energy from an energy source onto the layer of additive material to fuse a portion of the additive material and form the valve assembly. The valve assembly includes a valve housing defining a substantially cylindrical channel, a first mounting feature, and a second mounting feature, the first mounting feature and the second mounting feature being positioned at opposite sides of the cylindrical channel to define a hinge axis. A valve flap includes a hinge member extending along the hinge axis and defining a first complementary feature for engaging the first mounting feature and a second complementary feature for engaging the second mounting feature.

In still another exemplary embodiment of the present disclosure, an additively manufactured valve assembly is provided. The valve assembly includes a valve housing defining a substantially cylindrical channel, a first mounting feature, and a second mounting feature, the first mounting feature and the second mounting feature being positioned at opposite sides of the cylindrical channel to define a hinge axis. A valve flap includes a hinge member extending along the hinge axis and defining a first complementary feature for engaging the first mounting feature and a second complementary feature for engaging the second mounting feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
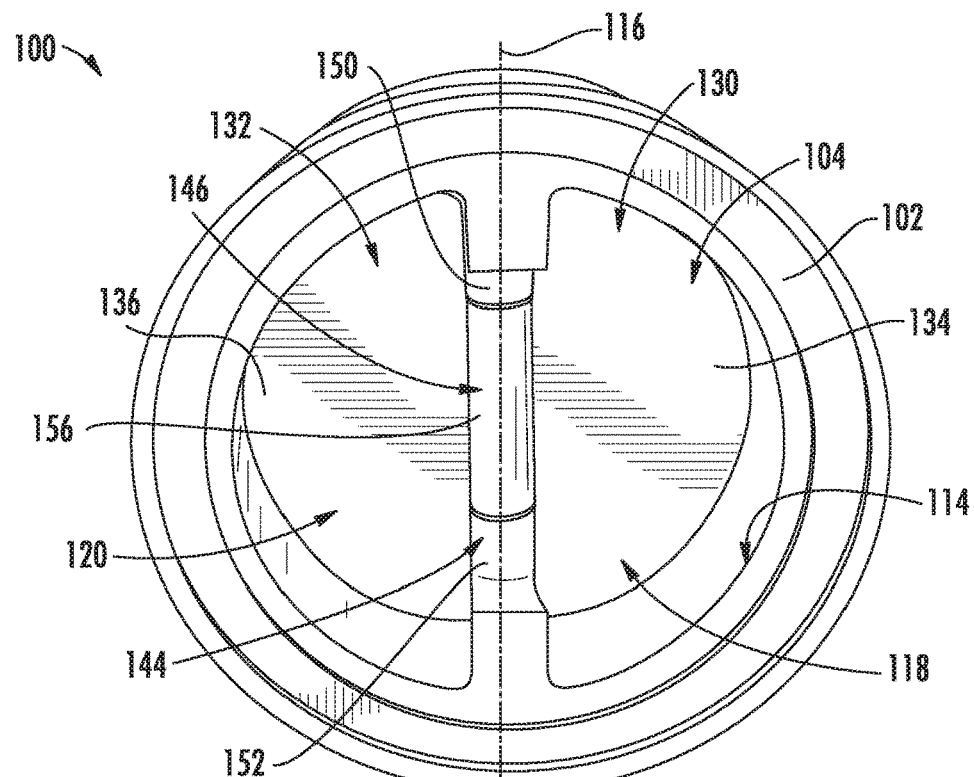
FIG. 1 is a perspective view of a valve assembly including two valve flaps in a closed position according to an exemplary embodiment of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent margin of error.

The present disclosure is generally directed to a valve assembly and a method of additively manufacturing the same. The valve assembly includes a valve housing defining first and second mounting features, such as recessed dimples or protruding bumps, positioned on opposite sides of a substantially cylindrical channel to define a hinge axis. One or more valve flaps are positioned within the cylindrical channel, each valve flap including a hinge member extending along the hinge axis and defining two or more complementary features or coupling members for engaging either the mounting features of the valve housing or an adjacent hinge member.

Referring now generally to FIGS. 1 through 7, a valve assembly 100 is provided in accordance with an exemplary embodiment of the present disclosure. Although the construction and method of making valve assembly 100 are described generally herein, it should be appreciated that valve assembly 100 can be configured for use in any suitable application and in any suitable industry. For example, the concepts described herein could be used in automotive, aviation, maritime, and other industries to assist in a fluid control process. Moreover, FIG. 1 illustrates an exemplary embodiment of valve assembly 100 for the purpose of explaining its general operation, but the size, shape, and configuration of valve assembly 100 is not intended to limit the scope of the present subject matter.

In general, the exemplary embodiments of valve assembly 100 described herein may be manufactured or formed using any suitable process. However, in accordance with several aspects of the present subject matter, some or all of valve assembly 100 may be formed using an additive-manufacturing process, such as a 3-D printing process. The use of such a process may allow valve assembly 100 to be formed integrally, as a single monolithic component, or as any suitable number of sub-components. In particular, the manufacturing process may allow valve assembly 100 to be integrally formed and include a variety of features not possible when using prior manufacturing methods. For example, the additive manufacturing methods described herein enable the manufacture of valve assemblies having unique features, configurations, thicknesses, materials, densities, and structures not possible using prior manufacturing methods. Some of these novel features can, for example, permit relative motion between two components of valve assembly 100 after simultaneous formation of such components using an additive manufacturing process as described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and features that allow for relative motion between sub-components. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Referring now generally to FIGS. 1 through 7, various views of a valve assembly 100 in accordance with an exemplary embodiment of the present disclosure are provided. Notably, FIGS. 1 through 7 illustrate only portions of valve assembly 100 for the purpose of explaining aspects of the present subject matter, while other components are removed for clarity. In addition, valve assembly 100 is only one exemplary valve assembly and other types and configurations of valve assemblies may be used according to alternative embodiments. The particular exemplary embodiment described is not intended to limit the subject matter of the present disclosure in any manner.

Figure 2:
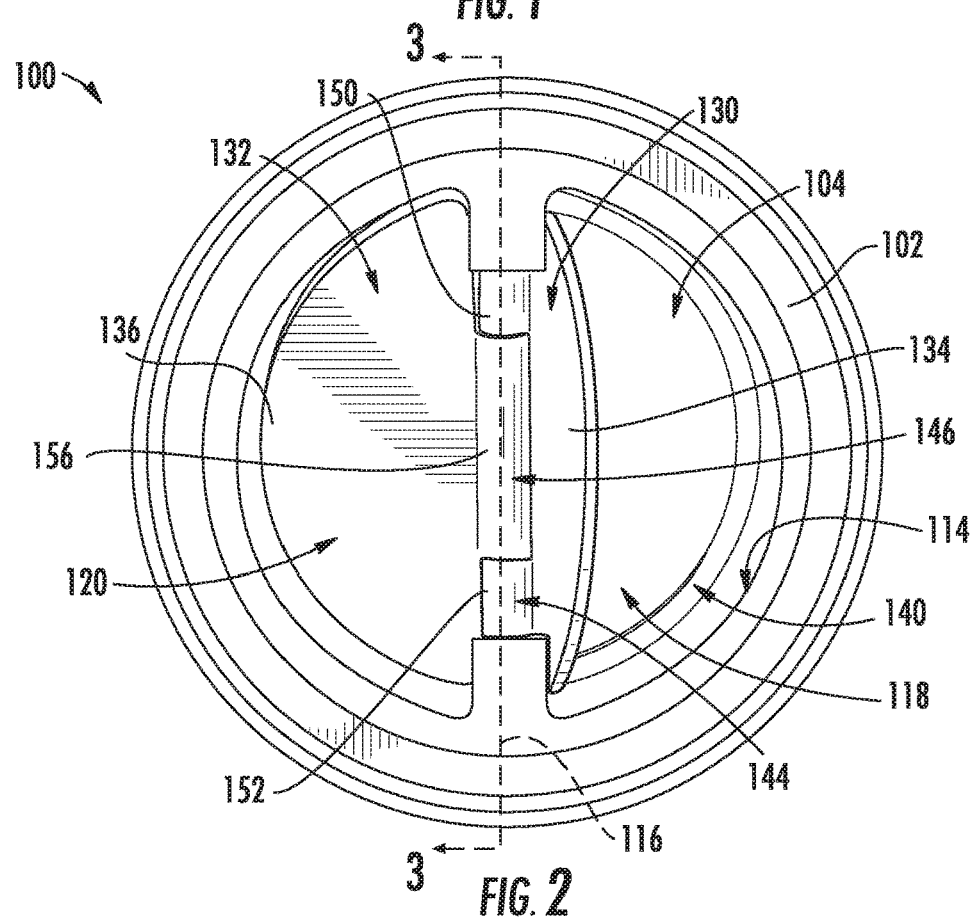
FIG. 2 is a top view of the exemplary valve assembly of FIG. 1, with one of the valve flaps illustrated in an open position.
Figure 3:
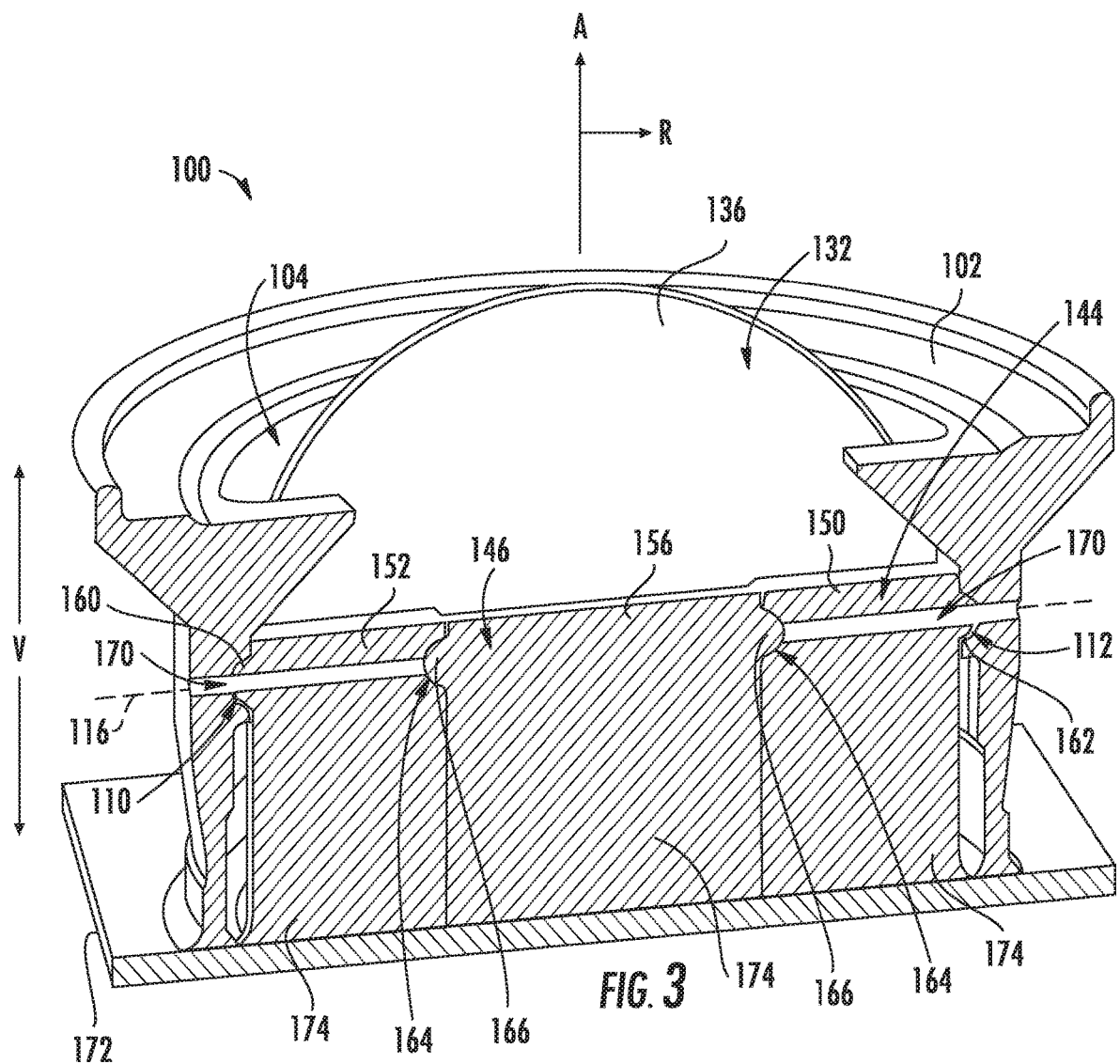
FIG. 3 is a cross sectional view of the exemplary valve assembly of FIG. 1, taken along Line 3-3 of FIG. 2.

As best shown in FIGS. 1 through 3, valve assembly 100 includes a valve housing 102 that generally defines an axial direction A and a radial direction R. Valve housing 102 further defines a cylindrical channel 104 through which fluid may flow during operation of valve assembly 100. Although not illustrated in the figures, it should be appreciated that valve housing 102 may further define one or more features for coupling valve housing 100 to one or more external fluid conduits. For example, valve housing 102 may further define one or more threaded surface, press-fit surfaces, clamping flanges, or any other suitable coupling features. In addition, although valve housing 102 and cylindrical channel 104 are illustrated herein as being substantially cylindrical, e.g., to facilitate coupling with conventional piping, it should be appreciated that other suitable sizes, shapes, and configurations may be used for these components while remaining within the scope of the present subject matter.

As best illustrated in FIG. 3, valve housing 102 defines a first mounting feature 110 and a second mounting feature 112, e.g., on an interior wall 114 defining cylindrical channel 104. First mounting feature 110 and second mounting feature 112 may be positioned at opposite sides of cylindrical channel 104, e.g., spaced apart by 180 degrees about a circumference of cylindrical channel 104. In this regard, first mounting feature 110 and second mounting feature 112 may define a hinge axis 116 extending across the center of cylindrical channel 104, e.g., to divide cylindrical channel 104 into a first semicircle 118 and a second semicircle 120. Although hinge axis 116 is illustrated herein as dividing cylindrical channel in half, it should be appreciated that hinge axis 116 may be positioned and/or oriented differently according to alternative embodiments to divide cylindrical channel 104 in a different manner.

As used herein, "mounting feature" may refer to any feature defined by valve housing 102 for receiving one or more valve flaps, as described according to an exemplary embodiment below. For example, mounting features 110, 112 may be one or more of a protruding knob, a recessed dimple, or any other suitable feature configured for receiving a complementary mounting member. In addition, each mounting feature 110, 112 may be different than other mounting features and may permit rotational motion of the valve flaps. For example, according to the illustrated embodiment, first mounting feature 110 and second mounting feature 112 are recessed dimples, though protruding knobs or a combination of the two may be used according to alternative embodiments.

Referring now to FIGS. 1 through 4, valve assembly 100 includes a first valve flap 130 and a second valve flap 132 that are positioned within cylindrical channel 104 and are rotatable about hinge axis 116 between an open position and a closed position. More specifically, according to the illustrated embodiment, first valve flap 130 includes a first leaf 134 positioned within first semicircle 118 and second valve flap 132 comprises a second leaf 136 positioned within second semicircle 120. Each of first leaf 134 and second leaf 136 are semi-circular such that when both are positioned in the closed position (see, e.g., FIG. 1), they form a circle that substantially closes off cylindrical channel 104 to prevent the flow of fluid therethrough. By contrast, first leaf 134 and/or second leaf 136 may be pivoted toward an open position (see, e.g., FIGS. 2 and 3) to permit a flow of fluid through cylindrical channel 104.

Figure 5:
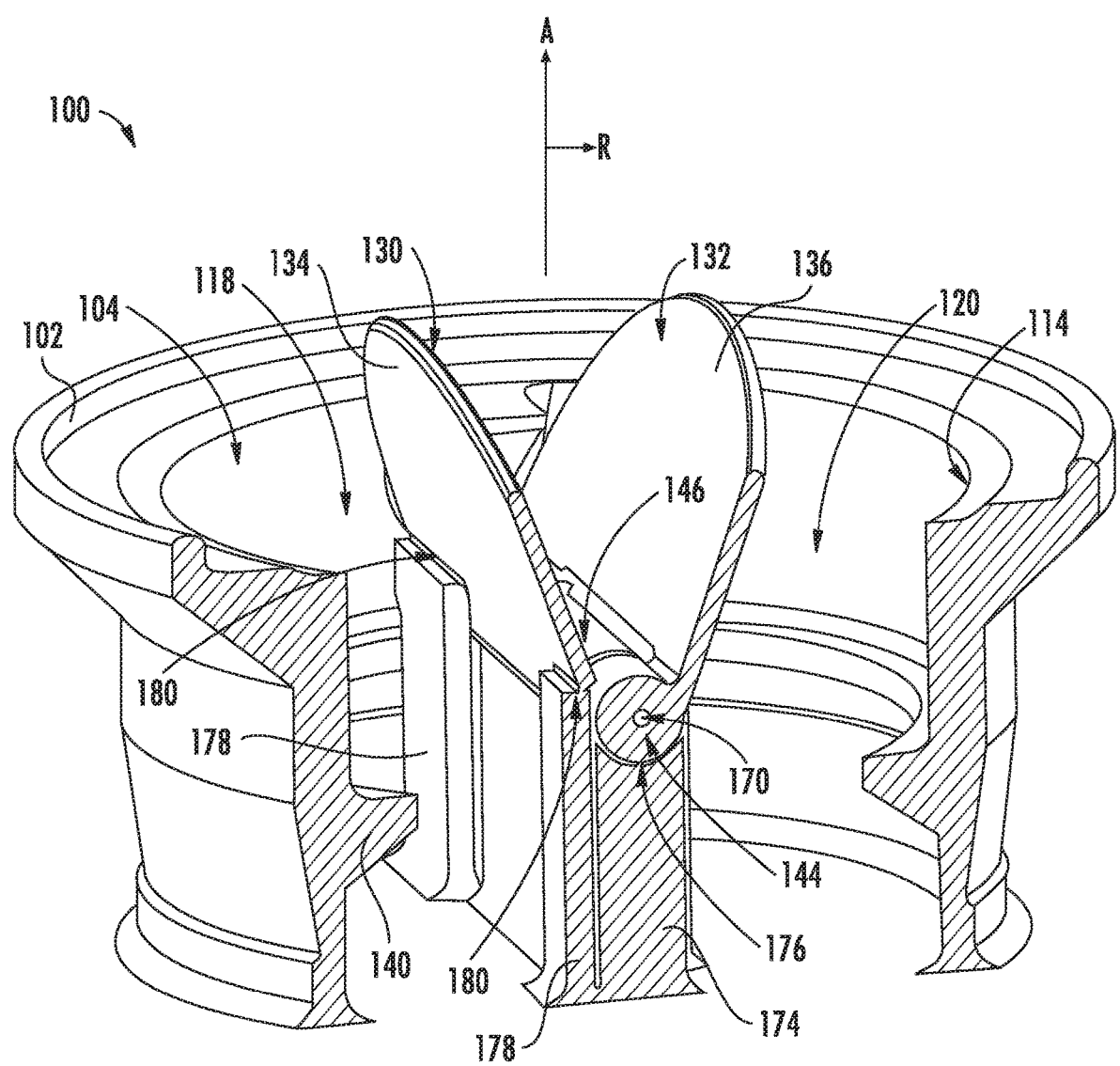
FIG. 5 is another cross-sectional view of the exemplary valve assembly of FIG. 1.

As best illustrated in FIGS. 2 and 5, valve housing 102 further defines a circumferential flange 140 that extends from interior wall 114 inward along a radial direction R. In this manner, circumferential flange 140 acts as a valve seat against which first leaf 134 and second leaf 136 may rest and seal cylindrical channel 104 when in the closed position. According to an exemplary embodiment, a seal or resilient member may be positioned on flange 140 in order to improve the fluid seal formed between flange 140 and leaves 134, 136. According to still another embodiment, flange 140 could be removed altogether and another stopping mechanism could be used as a seat for leaves 134, 136 in the closed position.

Figure 4:
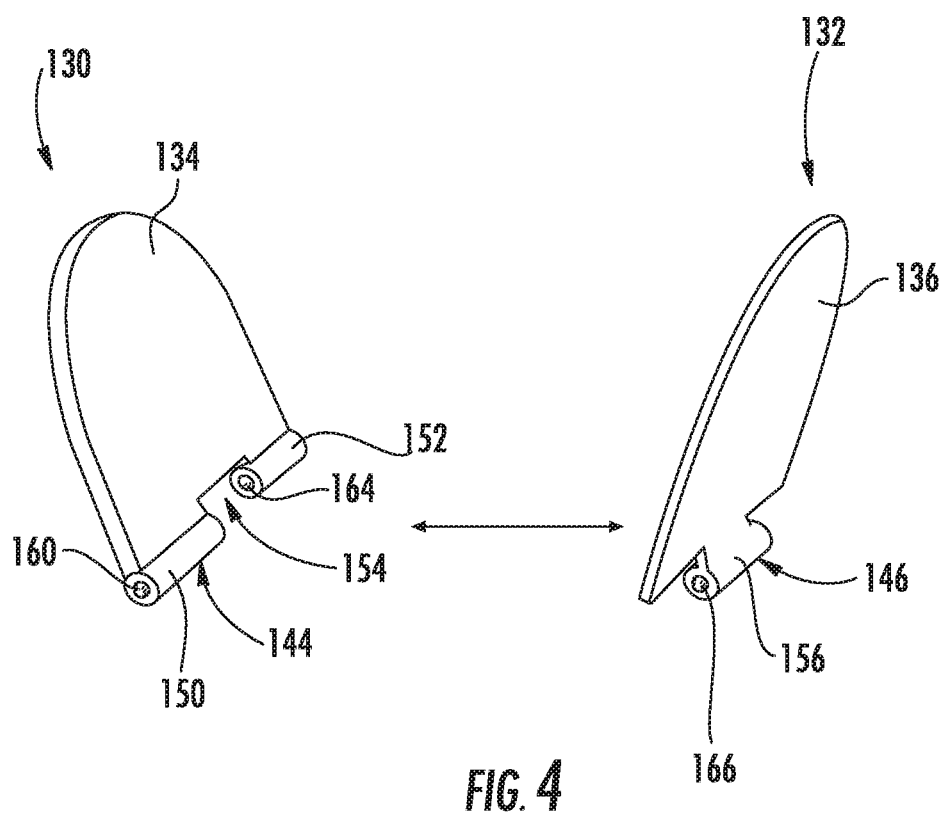
FIG. 4 is an exploded perspective view of two valve flaps of the exemplary valve assembly of FIG. 1 and their respective hinge members according to an exemplary embodiment of the present subject matter.

As best illustrated in FIGS. 3 and 4, first valve flap 130 generally includes a first hinge member 144 that includes one or more knuckles and extends along hinge axis 116 at least partially between first mounting feature 110 and second mounting feature 112. Similarly, second valve flap 132 generally includes a second hinge member 146 that includes one or more knuckles and extends along hinge axis 116 at least partially between first mounting feature 110 and second mounting feature 112.

In general, each of first hinge member 144 and second hinge member 146 may include any suitable number and size of knuckles, which collectively make up the hinge of valve assembly 100. For example, according to the illustrated embodiment, first hinge member 144 is split into a first knuckle 150 and a second knuckle 152 separated along hinge axis 116 by a gap 154. In addition, second hinge member 146 comprises a single, third knuckle 156 that is received within gap 154 to form a single hinge that extends between first mounting feature 110 and second mounting feature 112. However, it should be appreciated that according to alternative embodiments, hinge members 144, 146 can each be a single knuckle extending along half of a length of hinge axis 116. Alternatively, each hinge member 144, 146 may include two or more knuckles.

In general, hinge members 144, 146 (and their knuckles) are coupled with adjacent hinge members 144, 146 or mounting features 110, 112 of valve housing 102 by one or more complementary features or coupling members, as described below. For example, referring to the embodiment illustrated in FIGS. 3 and 4, first knuckle 150 defines a first complementary feature 160 (e.g., illustrated as a protruding bump) configured for receipt in first mounting feature 110 and third knuckle 156 defines a second complementary feature 162 (e.g., illustrated as a protruding bump) configured for receipt in second mounting feature 112. In addition, first knuckle 150 and third knuckle 156 each define a first coupling member 164 positioned adjacent gap 154 (e.g., illustrated as a recessed dimple).

In addition, second hinge member 146, which includes a single third knuckle 156, defines a second coupling member 166 on each end of third knuckle 156 (e.g., illustrated as protruding bumps). In this manner, second coupling members 166 are received in first coupling members 164 and complementary features 160, 162 are received in mounting features 110, 112 to form a complete hinge extending along hinge axis 116 within valve housing 102.

According to still another embodiment where there are a total of only two hinge knuckles, first hinge member 144 defines a first complementary feature 160 for engaging first mounting feature 110 and second hinge member 146 defines a second complementary feature 162 for engaging second mounting feature 112. In addition, first hinge member 144 defines a first coupling member 164 and second hinge member 144 defines a second coupling member 166. In this manner, first coupling member 164 and second coupling member 166, which may be a protruding bump and a recessed dimple, respectively, engage each other to form a joint and fix valve flaps 130, 132 within cylindrical channel 104.

As best illustrated in FIG. 3, at least one of first hinge member 144 and second hinge member 146 may define an internal channel 170 extending substantially along hinge axis 116. Internal channel 170 may help reduce the friction between hinge members 144, 146 and/or valve housing 102. In addition, internal channel 170 may reduce the overall weight of valve assembly 100 and provide a pathway for the removal of any byproducts of the additive manufacturing process.

Notably, according to the exemplary embodiment described herein, first valve flap 130 and second valve flap 132 are simultaneously additively manufactured with valve housing 102. For example, as illustrated schematically in FIG. 3, valve assembly 100 generally defines a vertical direction V parallel to the axial direction A. Valve flaps 130, 132 and valve housing 102 are additively manufactured on a build platform 172 along the vertical direction V. In this regard, valve flaps 130, 132 and valve housing 102 are thus additively manufactured (e.g., "printed") simultaneously layer-by-layer along the vertical direction V using one or more of the additive manufacturing techniques described above.

Figure 6:
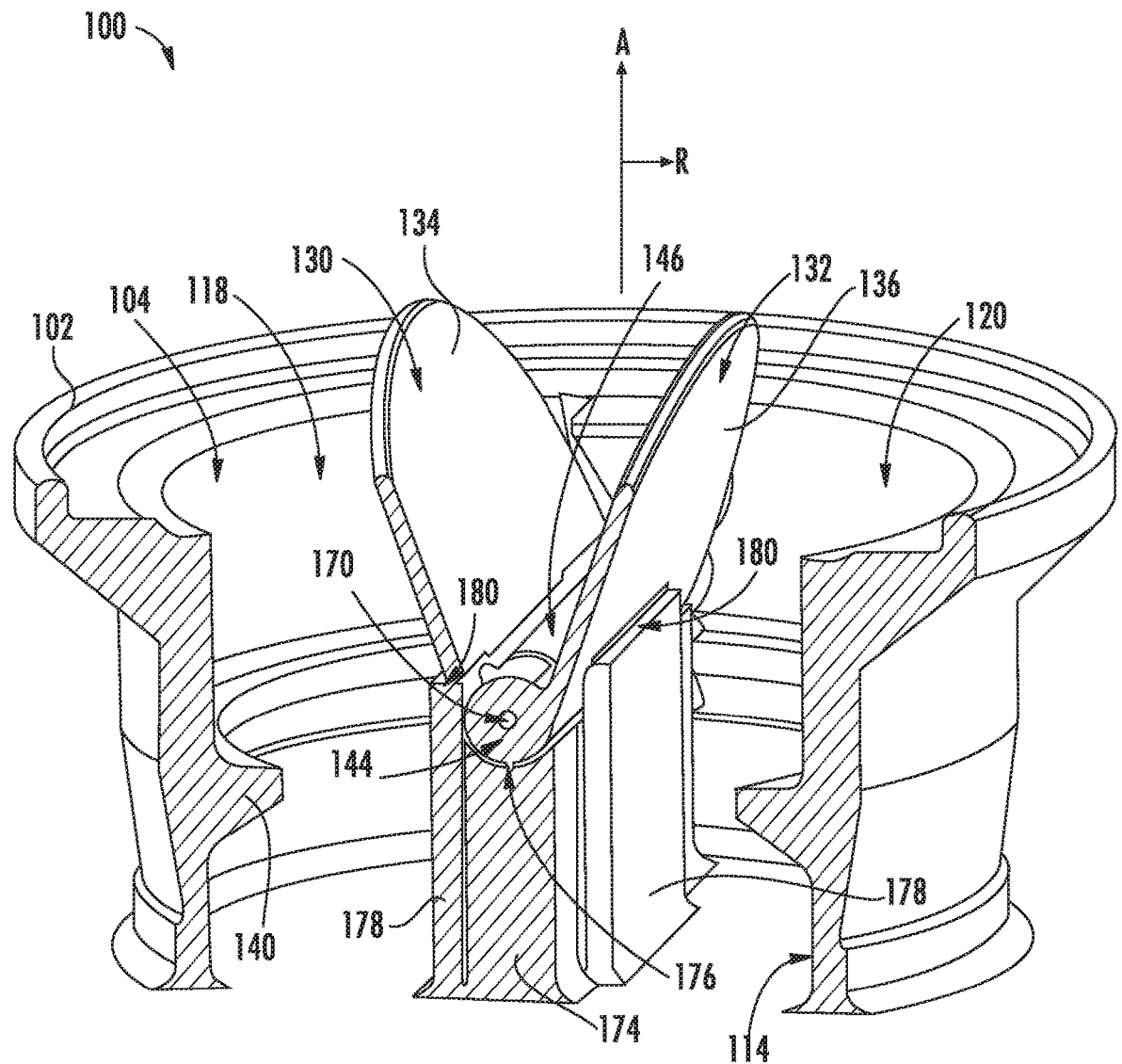
FIG. 6 is another cross-sectional view of the exemplary valve assembly of FIG. 1.
Figure 7:
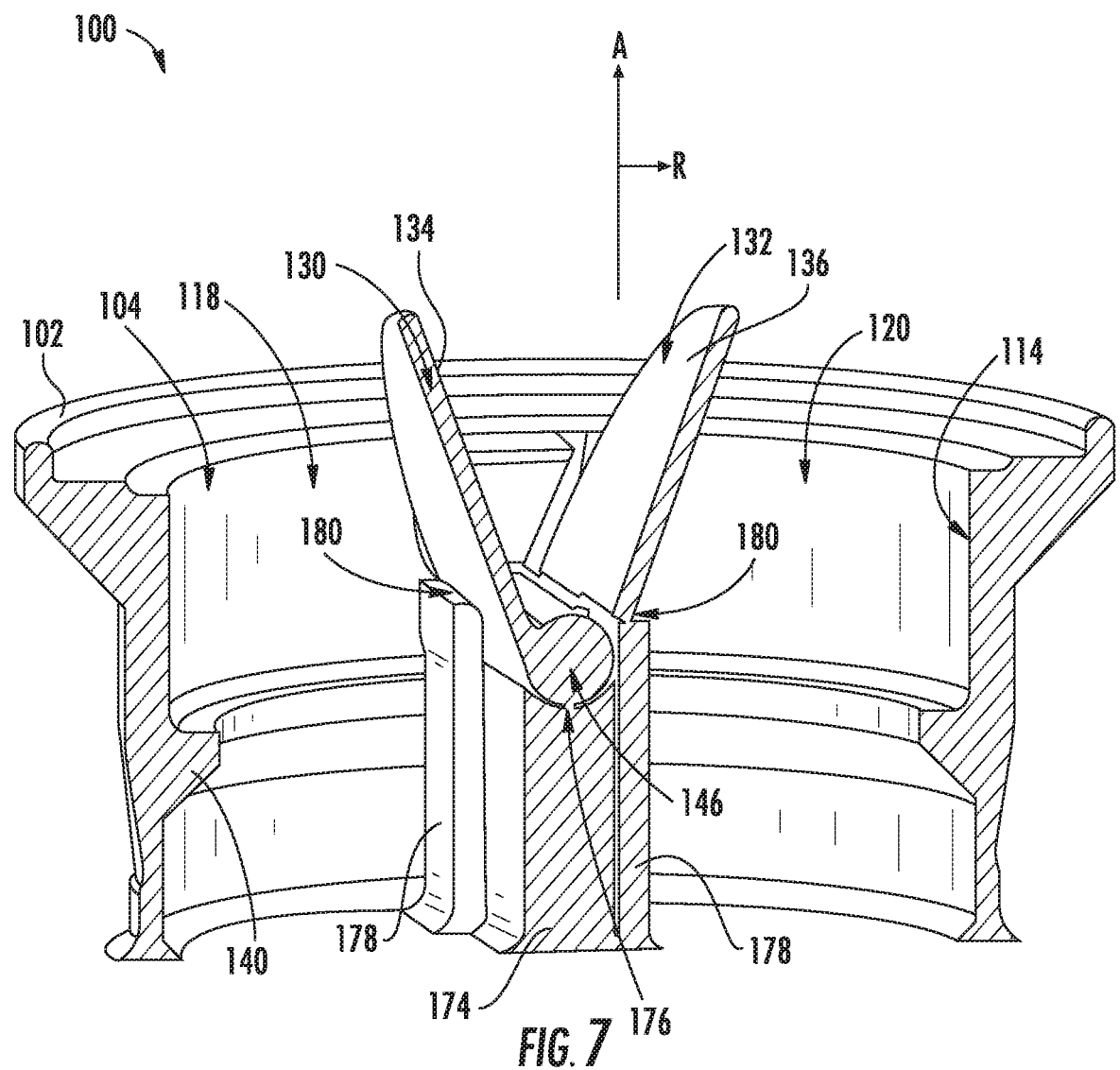
FIG. 7 is another cross-sectional view of the exemplary valve assembly of FIG. 1.

In order to support certain features of valve assembly 100 during the additive manufacturing process, various vertical support members are printed to temporarily support these components and are removed after the printing is complete. For example, as best shown in FIGS. 5 through 7, valve assembly 100 includes a hinge support structure 174 positioned below first hinge member 144 and second hinge member 146 along the vertical direction V. As illustrated, hinge support structure 174 is attached to first hinge member 144 and second hinge member 146 by a first frangible connecting member 176 which is breakable for separating and removing hinge support structure 174 from valve assembly 100 after printing.

In addition, because certain portions of first leaf 134 and second leaf 136 are cantilevered relative to hinge members 144, 146, vertical support may be needed during the printing of these parts as well. Thus, valve assembly 100 may further include a leaf support structure 178 positioned below first leaf 134 and second leaf 136 along the vertical direction V. Leaf support structure 178 may be attached to first leaf 134 and second leaf 136 by a second frangible connecting member 180 which is breakable for separating and removing leaf support structure 178 from valve assembly 100 after printing.

In general, frangible connecting members 176, 180 may generally be any region of valve assembly 100 that has a relatively low density or is otherwise configured for fracturing or breaking more readily than the rest of valve assembly 100. In this manner, frangible connecting members 176, 180 are more easily broken for removal of hinge support structure 174 and leaf support structure 178 after printing. For example, as illustrated in FIG. 5., frangible connecting members 176, 180 may define a necked portion that is thinner than hinge members 144, 146 and support structures 174, 178. In addition, frangible connecting members 176, 180 may be intentionally printed at a lower density or to include porosity such that they provide vertical support for printing hinge members 144, 146 but are easily breakable. According to still another embodiment, frangible connecting members 176, 180 may define a series of voids along a fracture line (e.g., similar to perforated paper).

Although FIGS. 1 through 7 illustrate valve assembly 100 as having two valve flaps, it should be appreciated that other valve configurations are possible and within the scope of the present subject matter. For example, referring now to FIG. 8, a valve assembly 184 including a single valve flap 186 will be described according to an exemplary embodiment. Due to the similarity between valve assembly 100 and valve assembly 184, like reference numerals may be used to refer to the same or similar features.

As illustrated, valve assembly 184 includes a valve housing that is substantially identical to valve housing 102. More specifically, valve housing 102 defines a substantially cylindrical channel 104, a first mounting feature 110, and a second mounting feature 112. First mounting feature 110 and second mounting feature 112 are positioned at opposite sides of cylindrical channel 104 to define a hinge axis 116.

However, instead of including first valve flap 130 and second valve flap 132, valve assembly 184 includes a single valve flap 186 including a hinge member extending along hinge axis 116 and defining a first complementary feature 160 for engaging first mounting feature 110 and a second complementary feature 162 for engaging the second mounting feature 112. According to the exemplary embodiment, mounting features 110, 112 are recessed dimples and complementary features 160, 162 are protruding bumps. However, it should be appreciated that any suitable complementary and engaging features may be used according to alternative embodiments.

Figure 8:
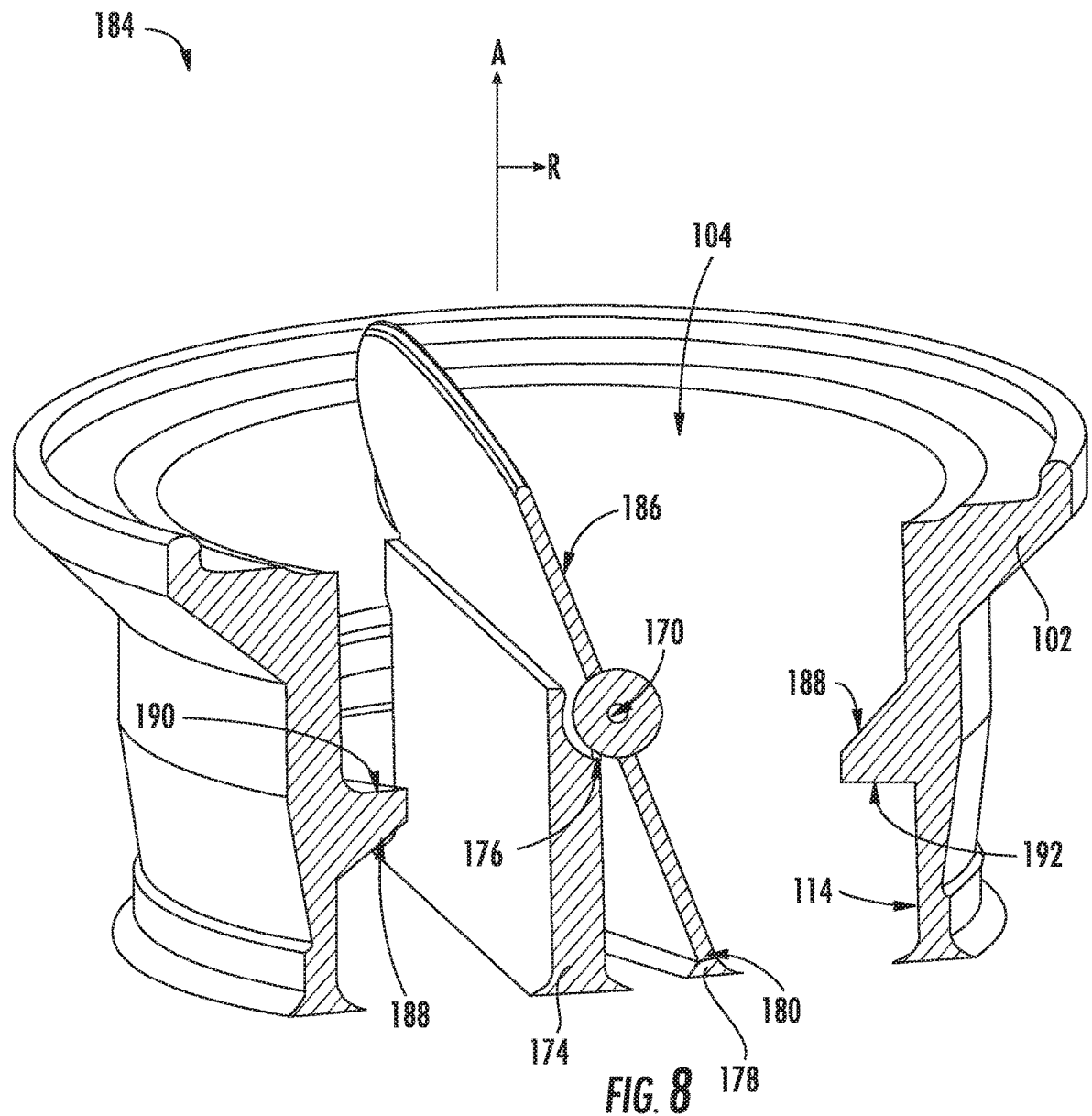
FIG. 8 is a perspective cross sectional view of a valve assembly including a single valve flap in a partially open position according to another exemplary embodiment of the present subject matter.

Still referring to FIG. 8, due to the pivotal motion of single valve flap 186 about hinge axis 116, valve housing 102 defines a split circumferential flange 188 that defines an a first sealing surface 190 facing one direction along the axial direction A and a second sealing surface 192 facing the opposite direction along the axial direction A. More specifically, valve flap 186 is positioned within cylindrical channel 104 and is pivotable about hinge axis 116 between an open position and a closed position. Both sealing surfaces 190, 192 extend inward along the radial direction R such that valve flap 186 may rotate into and out of sealing engagement with sealing surfaces 190, 192.

It should be appreciated that valve assembles 100, 184 are described herein only for the purpose of explaining aspects of the present subject matter. For example, valve assemblies 100, 184 will be used herein to describe exemplary configurations, constructions, and methods of manufacturing valve assemblies 100, 184. It should be appreciated that the additive manufacturing techniques discussed herein may be used to manufacture other valve assemblies and components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of valve assemblies 100, 184 according to an exemplary embodiment of the present subject matter has been presented, an exemplary method 200 for forming a valve assembly according to an exemplary embodiment of the present subject matter is provided. Method 200 can be used by a manufacturer to form valve assembly 100, or any other suitable valve assembly. It should be appreciated that the exemplary method 200 is discussed herein only to describe exemplary aspects of the present subject matter, and is not intended to be limiting.

Figure 9:
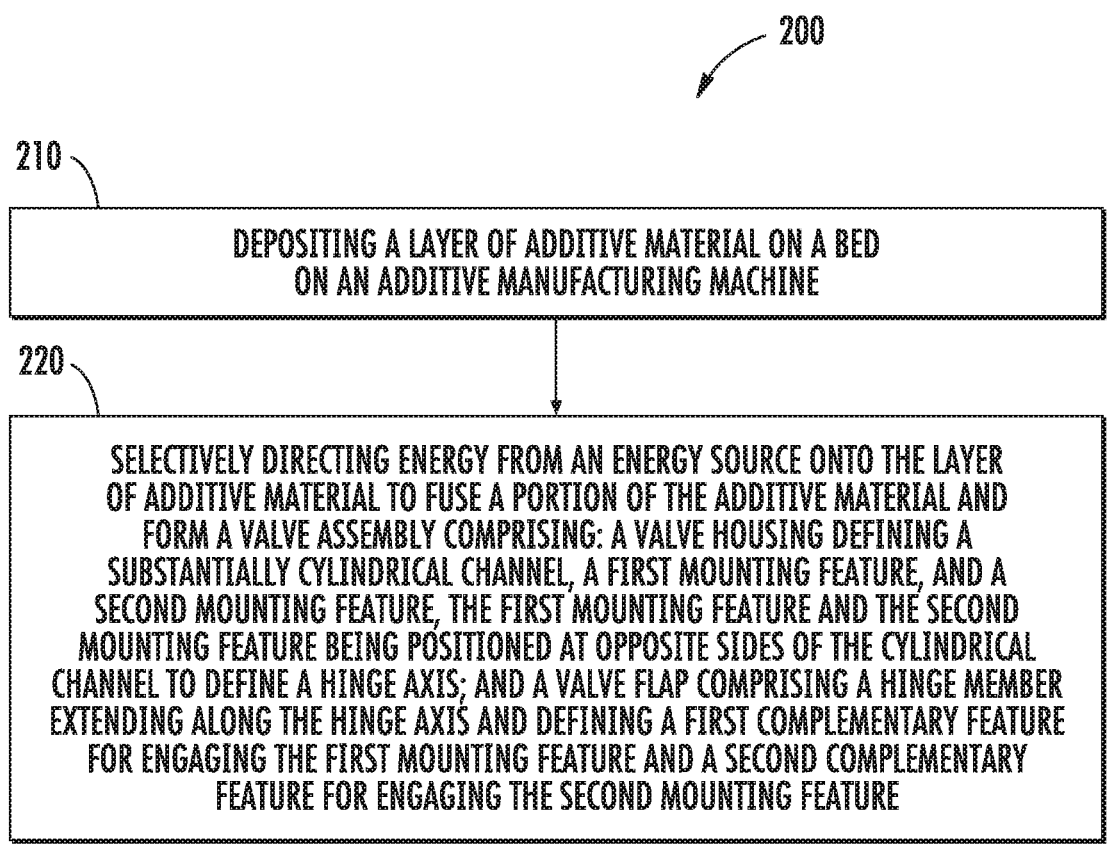
FIG. 9 is a method of manufacturing a valve assembly according to an exemplary embodiment of the present subject matter.

Referring now to FIG. 9, method 200 includes, at step 210, depositing a layer of additive material on a bed of an additive manufacturing machine. Step 220 includes selectively directing energy from an energy source onto the layer of additive material to fuse a portion of the additive material and form the valve assembly. The valve assembly formed may be similar in some or all respects to valve assembly 100 or valve assembly 184, as described above.

For example, using the example from above, the valve assembly formed at step 210 may include a valve housing defining a substantially cylindrical channel, a first mounting feature, and a second mounting feature. The first mounting feature and the second mounting feature may be positioned at opposite sides of the cylindrical channel to define a hinge axis. In addition, the valve assembly may include a valve flap including a hinge member extending along the hinge axis and defining a first complementary feature for engaging the first mounting feature and a second complementary feature for engaging the second mounting feature.

Method 200 may further include forming a hinge support structure positioned below the hinge member along a vertical direction. The hinge support structure may be attached to the hinge member by a first frangible connecting member, the first frangible connecting member being breakable for separating and removing the hinge support structure from the valve assembly. Notably, according to an exemplary embodiment, the valve housing and the valve flap are simultaneously additively manufactured as distinct, but inseparable monolithic components.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using valve assembly 100 as an example, it should be appreciated that these methods may be applied to manufacture any suitable valve assembly or hinged component.

An additively manufactured valve assembly and a method for manufacturing that valve assembly are described above. Notably, the valve assembly may generally include performance-enhancing features whose practical implementations are facilitated by an additive manufacturing process. For example, using the additive manufacturing methods described herein, the valve assembly may include one or more valve flaps that are inseparably formed within a valve housing but which may rotate relative to valve housing. These features may be introduced during the design of the valve assembly, such that they may be easily integrated into the valve assembly during the build process at little or no additional cost. Moreover, the entire valve assembly, including the valve housing, the valve flaps, and other valve features can be formed simultaneously as one or more integral and monolithic components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured valve assembly defining a vertical direction, the valve assembly comprising:
   a valve housing defining a substantially cylindrical channel, a first mounting feature, and a second mounting feature, the first mounting feature and the second mounting feature being positioned at opposite sides of the cylindrical channel to define a hinge axis perpendicular to the vertical direction;
   a first valve flap comprising a first hinge member, the first hinge member extending along the hinge axis and defining a first complementary feature for engaging the first mounting feature of the valve housing and a first coupling member; and
   a second valve flap comprising a second hinge member, the second hinge member extending along the hinge axis and defining a second complementary feature for engaging the second mounting feature of the valve housing and a second coupling member for engaging the first coupling member, wherein the valve housing, the first valve flap, and the second valve flap are simultaneously additively manufactured on a build platform along the vertical direction as distinct, but inseparable monolithic components.

2. The valve assembly of claim 1, wherein the first hinge member is split into a first knuckle and a second knuckle separated along the hinge axis by a gap, and wherein the second hinge member comprises a third knuckle that is received within the gap.

3. The valve assembly of claim 1, wherein the hinge axis divides the cylindrical channel into a first semicircle and a second semicircle.

4. The valve assembly of claim 3, wherein the first valve flap comprises a first leaf positioned within the first semicircle and the second valve flap comprises a second leaf positioned within the second semicircle.

5. The valve assembly of claim 4, further comprising:
   a leaf support structure positioned below the first leaf and the second leaf along the vertical direction, the leaf support structure being attached to the first leaf and the second leaf by a second frangible connecting member, the second frangible connecting member being breakable for separating and removing the leaf support structure from the valve assembly.

6. The valve assembly of claim 1, wherein each of the first mounting feature and the second mounting feature are either a protruding knob or a recessed dimple.

7. The valve assembly of claim 1, wherein the valve housing further defines a circumferential flange that extends inward along a radial direction.

8. The valve assembly of claim 1, wherein at least one of the first hinge member and the second hinge member defines an internal channel extending substantially along the hinge axis.

9. The valve assembly of claim 1, further comprising:
   a hinge support structure positioned below the first hinge member and the second hinge member along the vertical direction, the hinge support structure being attached to the first hinge member and the second hinge member by a first frangible connecting member, the first frangible connecting member being breakable for separating and removing the hinge support structure from the valve assembly.

10. A method for manufacturing a valve assembly, the method comprising:
    depositing a layer of additive material on a bed of an additive manufacturing machine; and selectively directing energy from an energy source onto the layer of additive material to fuse a portion of the additive material and form the valve assembly comprising:
- a valve housing defining a substantially cylindrical channel, a first mounting feature, and a second mounting feature, the first mounting feature and the second mounting feature being positioned at opposite sides of the cylindrical channel to define a hinge axis;
- a valve flap comprising a hinge member extending along the hinge axis and defining a first complementary feature for engaging the first mounting feature and a second complementary feature for engaging the second mounting feature; and
- a hinge support structure positioned below the hinge member along a vertical direction, the hinge support structure being attached to the hinge member by a frangible connecting member, the frangible connecting member being breakable for separating and removing the hinge support structure from the valve assembly.

11. The method of claim 10, wherein the valve housing and the valve flap are simultaneously additively manufactured as distinct, but inseparable monolithic components.

12. An additively manufactured valve assembly, comprising:
- a valve housing defining a substantially cylindrical channel, a first mounting feature, and a second mounting feature, the first mounting feature and the second mounting feature being positioned at opposite sides of the cylindrical channel to define a hinge axis;
- a valve flap comprising a hinge member extending along the hinge axis and defining a first complementary feature for engaging the first mounting feature and a second complementary feature for engaging the second mounting feature; and
- a hinge support structure positioned below the hinge member along a vertical direction, the hinge support structure being attached to the hinge member by a frangible connecting member, the frangible connecting member being breakable for separating and removing the hinge support structure from the valve assembly.

13. The valve assembly of claim 12, wherein each of the first mounting feature and the second mounting feature are either a protruding knob or a recessed dimple.

14. The valve assembly of claim 13, wherein the valve housing and the valve flap are simultaneously additively manufactured as distinct, but inseparable monolithic components.

15. The valve assembly of claim 12, wherein the valve housing further defines a circumferential flange that extends inward along a radial direction.

16. The valve assembly of claim 12, further comprising:
- a single leaf positioned within the cylindrical channel and being pivotable about the hinge axis between an open position and a closed position; and
- a leaf support structure positioned below the single leaf along the vertical direction, the leaf support structure being attached to the single leaf by a second frangible connecting member, the second frangible connecting member being breakable for separating and removing the leaf support structure from the valve assembly.

* * * * *